United States Patent [19]

Wurz

[11] 4,386,946
[45] Jun. 7, 1983

[54] WATER COOLING TOWER INCLUDING A SUCTION FAN

[76] Inventor: Dieter Wurz, Steinweg 48, 7507 Pfinztal, Fed. Rep. of Germany

[21] Appl. No.: 307,671

[22] Filed: Oct. 1, 1981

[30] Foreign Application Priority Data

Oct. 10, 1980 [DE]  Fed. Rep. of Germany ....... 3038363

[51] Int. Cl.³ .............................................. B01D 45/14
[52] U.S. Cl. ................................ 55/257 C; 55/257 R; 261/109; 261/DIG. 11; 261/DIG. 77
[58] Field of Search ............... 261/79 A, 109, 111, 261/DIG. 11, DIG. 77; 98/30; 55/257 R, 257 C, 259

[56] References Cited

U.S. PATENT DOCUMENTS

| | | | |
|---|---|---|---|
| 1,929,410 | 10/1933 | Coey | 261/109 X |
| 2,672,328 | 3/1954 | Mart et al. | 261/DIG. 11 |
| 2,833,122 | 5/1958 | Kohl et al. | 261/DIG. 11 |
| 2,859,831 | 11/1958 | Solnick et al. | 261/DIG. 11 |
| 2,990,031 | 6/1961 | Michael | 261/DIG. 11 |
| 3,585,786 | 6/1971 | Hardison | 55/257 C |
| 3,791,634 | 2/1974 | Phelps | 261/DIG. 11 |
| 3,870,773 | 3/1975 | Luzaich | 261/DIG. 11 |

FOREIGN PATENT DOCUMENTS

| | | | |
|---|---|---|---|
| 2509339 | 9/1975 | Fed. Rep. of Germany . | |
| 320505 | 10/1929 | United Kingdom | 261/DIG. 11 |

*Primary Examiner*—Richard L. Chiesa
*Attorney, Agent, or Firm*—Laubscher, Philpitt & Laubscher

[57] ABSTRACT

A water cooling tower is disclosed which comprises cooling means and a suction fan arranged in the air outlet passage. Water catching means is provided including at least one water catching channel formed in the wall of the air outlet passage at a location other than the narrowest cross section of the air outlet passage, which channel collects water separated at and flowing along the air outlet passage wall. A water discharging device connects the channel directly with a collecting basin for draining the water.

8 Claims, 13 Drawing Figures

U.S. Patent  Jun. 7, 1983  Sheet 1 of 3  4,386,946
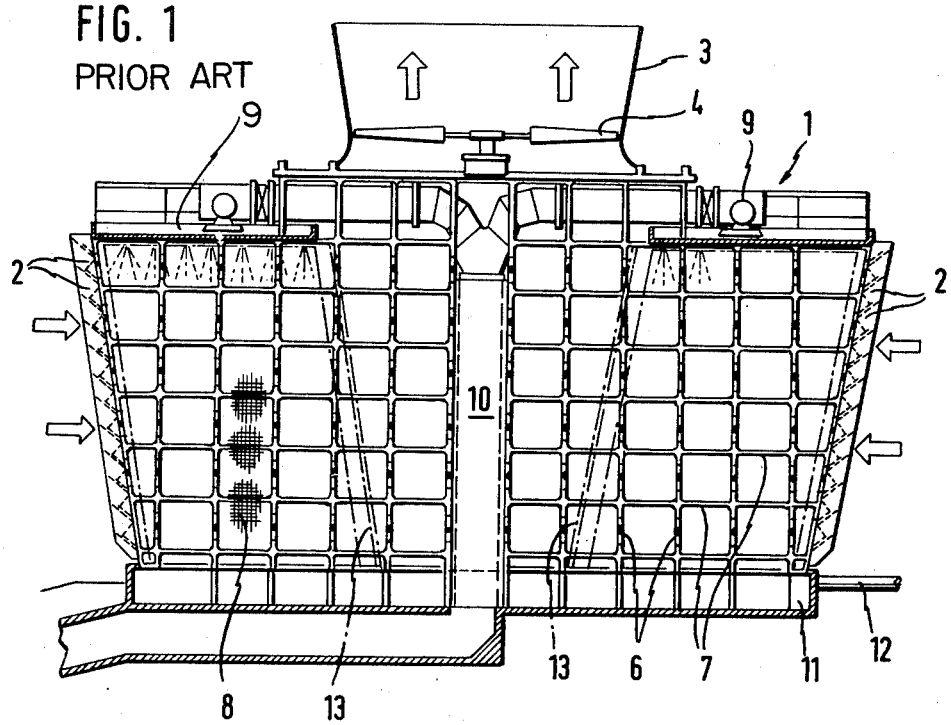
FIG. 1
PRIOR ART
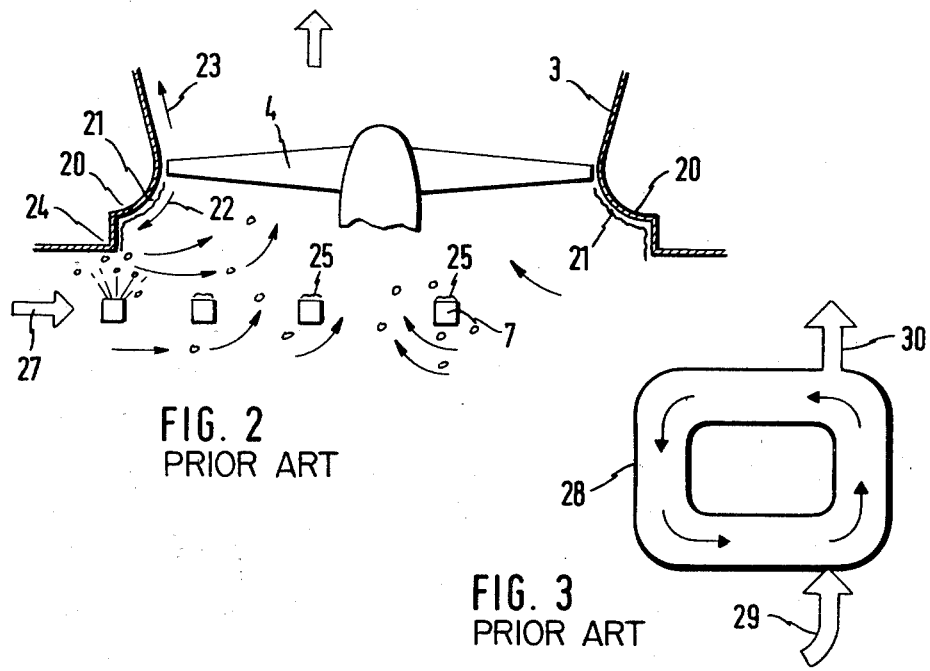
FIG. 2
PRIOR ART
FIG. 3
PRIOR ART

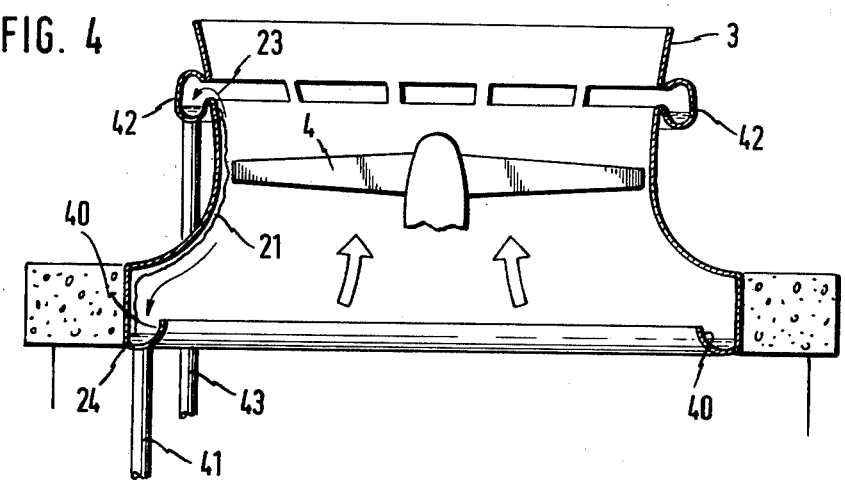
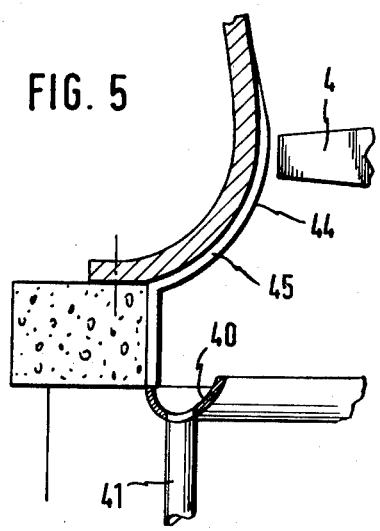
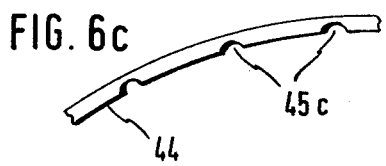
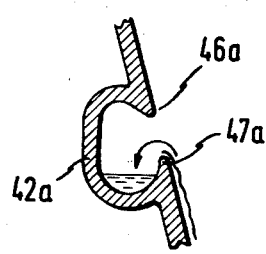
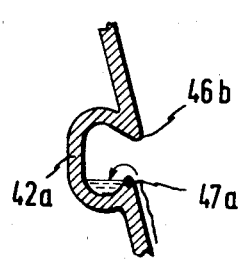
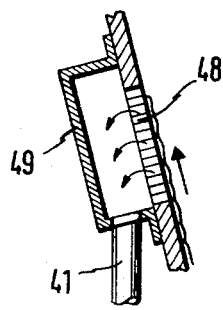

WATER COOLING TOWER INCLUDING A SUCTION FAN

BRIEF DESCRIPTION OF THE PRIOR ART

The instant invention relates to a fan cooling tower, comprising a suction fan in the air outlet passage and cooling structures on which the water to be cooled trickles and along which the air aspired by the fan passes, thus cooling the water which trickles down into a collecting basin by direct contact.

A known cooling tower is disclosed in U.S. Pat. No. 1,929,410 in which a vane ring produces an angular momentum in the air flow. The tower comprises a water catching device in the form of an inverted U-shaped sectional member placed on the upper edge of the air outlet passage. This sectional member deflects separated water around the upper edge of the air outlet to the outside so as to promote flow down along the outer wall of the air outlet into the water supply container disposed above the cooling structures.

Another known cooling tower, without permanent cooling structures, is disclosed in German Off. No. 2,509,339. A vane ring likewise produces an angular momentum in the air flow and a catching channel for the water driven radially outwardly by the angular momentum is provided in the zone of the narrowest cross section of the air outlet. This catching channel communicates directly with the collecting basin through a fallpipe.

Both these known cooling towers are of the so-called spin motion type. Such towers are costly because of the enormous energy required to produce such motion. The problem of an undue production and explusion of germs or bacteria has not been recognized or solved by either of the two known cooling towers. In the case of the first cooling tower mentioned in U.S. Pat. No. 1,929,410, any water separated is returned to the built-in cooling structure and may become enriched once more with germs. For reasons of flow mechanics effective protection against germs being driven out is not warranted.

In the case of the second known cooling tower mentioned disclosed in the German patent, larger size drops (from a diameter of 20 $\mu$m on) which, as experience shows, are the essential germ carriers, should be centrifuged in the zone below the air outlet so that the problem of excessive germ explusion does not arise. If the known cooling tower were operated without "spin" or angular momentum, there would be no effective separation at the catching channel because of the low pressure prevailing at this position upstream of the fan.

In another known cooling tower, including a suction fan in the air outlet passage and cooling structures on which the water to be cooled trickles and along which the air aspired by the fan passes to cool the water which trickles down into a collecting basin by direct contact, and further including a drop separator disposed downstream of the built-in cooling structures, the air which is propelled to a relatively high speed by the fan entrains cooling water drops of the warm cooling water trickling down. These cooling water drops are loaded with germs, such as bacteria, viruses and the like. When these components of the cooling water are expelled, their influence on the environment is undesired if their concentration is too high.

FIGS. 1–3 disclose a fan cooling tower including a suction fan as generally known in the prior art.

FIG. 1 shows a fan cooling tower of cross-flow type of the kind mentioned last. It is generally designated by reference numeral 1. The fan cooling tower 1 shown has lateral air inlet openings 2 and a central air outlet passage 3 at the top in the form of a diffuser. At the narrowest cross sectional area of passage there is a fan impeller 4 adapted to be driven in rotation at relatively high circumferential speeds (up to 50 m/sec. at the blade tips). The fan cooling tower further comprises a support structure including vertical supports 6 and transverse beams 7. A trickler means 9 supplied through a riser 10 with cooling water heated, for instance, in a power plant to temperatures of, for example 45° C., is disposed between the air outlet 3 and the built-in cooling structures 8, which may be provided, for instance, in the form of dripping bars of known design.

The cooling tower further comprises a collecting basin 11 at the bottom to collect the water which trickles down and is cooled in the air stream. If the circuit is closed, the cooled water is returned through a conduit 12 to the power station process, or the conduit 12 leads back to surface waters in case of drain operations. Normally, drop catchers 13, e.g. in the form of sine discs are installed in fan cooling towers of the kind shown in FIG. 1. The separating efficiency of drop catcher 13 is poor for drops of a diameter d of less than 50 $\mu$m. In rain zones, drops are formed in the cooling tower which have a diameter of less than d=50 $\mu$m. And the diameter dimension of the drop may diminish even further by evaporation. Therefore, a great percentage of drops of such size pass through the drop separator 13.

Measurements made with the inventor's participation have shown that the germ load, i.e. the charging with bacteria, viruses, and the like of the cooling water exiting in clouds out of the air outlet, per unit volume, is higher by two decimal powers than that of the heated cooling water entering the cooling tower. For instance, an order of $10^3$ germs/cm$^3$ water was measured in the influx of cooling water, while in the air outlet the measurement provided $10^5$ germs/cm$^3$ water. This shows that, at the same cooling performance, the germ emission of this type of cooling tower is higher by several decimal powers ($10^2$ to $10^4$) than, for instance, with natural draught cooling towers.

This is where the invention enters with the aim of reducing the amount of germ loading of the cooling water issuing particularly from the air outlet, to the lowest possible value.

FIGS. 2 and 3 serve to illustrate the considerations and investigations made by the inventor prior to solving the above problem, on a fan cooling tower of the kind specified initially. The inventor started from the assumption that the key to the explanation of the phenomenon mentioned would be in the physical processes taking place in the inner and upper range of the cooling tower. For this reason, he entered this particular part of the cooling tower which, normally, is not accessible since the prevailing high temperature and humidity can be supported by man for a short time only. The inventor observed that the wall section marked by reference numeral 20 in FIG. 2 of the air outlet passage 3, below the fan impeller 4, carries a liquid film 21 which, if sufficiently thick, flows down (arrow 22). An additional film flow of less thickness may form from the fan impeller 4 upwards along the wall of the air outlet passage 3 (arrow 23 in FIG. 2). The liquid collects at edges, like edge 24 or on horizontal surfaces, like surfaces 25 of the transverse beams 7, and then drops in great drops which have diameters from about 3 to 5 mm to reform the cloud flow (arrow 27). Smaller drops are directly carried upwards by the cloud, while greater ones fall down, splashing at least partly on the transverse beams 7 of the support structure so as to be entrained again in upward direction as well. The process observed by the inventor is similar to and comparable with a fluidized bed. In other words, a relatively great amount of water circulates between the fan impeller 4, the wall of the air outlet passage 3 and the support structure, whereas comparatively small proportional quantities of water are expelled from the air outlet 3 of the cooling tower. This fast is demonstrated in FIG. 3 in which the circuit 28 represents the relatively great amount of water circulating, while arrow 29 indicates the cooling water supply in the form of drops which were able to pass the drop separator 13 (minor germ loading, e.g. $10^3/cm^3$ water) and arrow 30 indicates the cooling water discharge through the air outlet passage 3 (major germ loading, e.g. $10^5/cm^3$ water).

SUMMARY OF THE INVENTION

The inventor's theoretical considerations and experimental investigations finally provided the solution of the problem according to which a water catching device comprising at least one catching channel in the wall of the air outlet passage at a location which is wider than the narrowest cross section of the air outlet passage catches water separated at and flowing along the wall of the air outlet, and a water discharging device comprising at least one fall pipe passing from the catching channel directly to the collecting basin drains the water. Preferably a drop separator is provided downstream of the cooling structures.

In accordance with an advantageous embodiment of the inventive concept a first catching channel is disposed in the wall of the air outlet passage below the fan impeller in the area of the enlarged lower edge of the air outlet so as to catch a film of water flowing down this wall. In addition, a second catching channel may be formed in a diffuser-like enlarged portion of the wall of the air outlet passage above the fan impeller. One or more fall pipes which lead into the collecting basin are provided. The channel collects a thin water film moving upwards by the air flow above the fan impeller. The pipes carry the water into the collecting basin.

Surprisingly, carrying away the water affords a considerable reduction of the amount of cooling water which exits freely out of the air outlet and a reduction of its germ charge as well. The reason is that the quantity of water circulating in the circuit 28 as shown in FIG. 3 is reduced considerably. This means that the water is prevented from remaining in the upper cooling tower range where conditions for germ propagation are particularly favorable. Instead, the water trickling down is carried away immediately from a range in which the temperature is favorable for germ propagation, e.g. 40° C. into the collecting basin where the temperature is much lower, e.g. 30° C. The germs contained in the cooling water thus suffer a temperature shock which is harmful to their propagation. Even if the germs are not damaged as to their reproduction when being led off into the cooling water of the collecting basin, no germ-enriched cooling water will be discharged from the air outlet.

The drainage of water from the area of the wall of the air outlet can be enhanced still further in a modified embodiment of the invention by the provision of grooves of different cross sectional shape extending vertically or obliquely in the wall of the air outlet above the water catching channel(s). The oblique arrangement is useful for adaptation to the angular momentum flow produced by the fan.

Furthermore, the transverse beams of the support structure may be installed between the vertical supports at an inclination promoting water flow-off. If an improvement is desired in existing cooling towers in which the transverse beams of the support structure are arranged horizontally, third water catching channels disposed at a water flow-off inclination may be associated with the horizontal transverse beams. In both cases the vertical supports of the support structure may serve as water discharging device. However, it is also possible to provide separate downpipes or fall pipes for the water running off the transverse beams. This design of the support structure eliminates the drop formation so that no water can be carried back into the circuit 28 from the support structure.

DETAILED DESCRIPTION OF THE INVENTION

The invention will be described further, by way of example, with reference to the accompanying drawings, in which:

FIG. 4 is a sectional elevation of the air outlet passage of a fan cooling tower comprising a water discharging device in accordance with the invention;

FIG. 5 is a part sectional elevation of the air outlet of a modified embodiment of the invention;

FIGS. 6a, 6b, 6c are horizontal part sections of the modified embodiment according to FIG. 5;

FIGS. 7a, 7b, 7c are enlarged part sections of embodiments of a water catching channel provided above the fan impeller;

For reasons of simplicity members having the same functions are marked by the same reference numerals in FIGS. 1 to 9.

Figure 8:
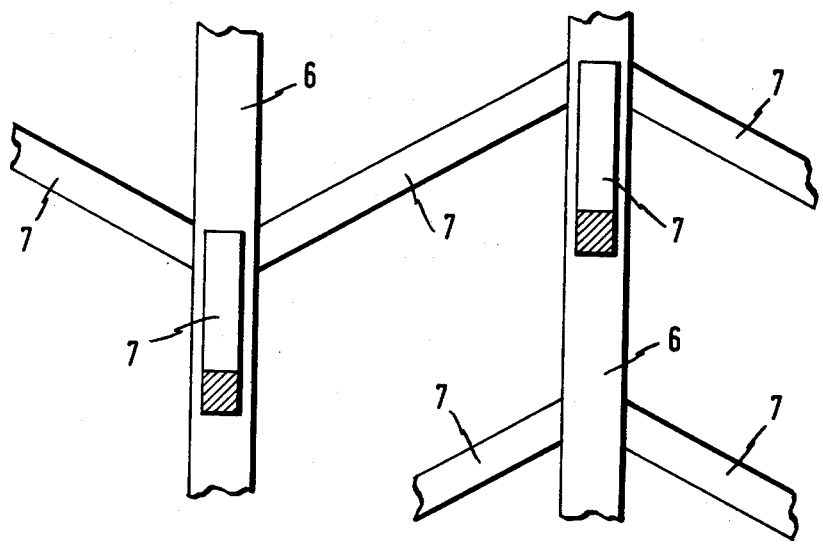
FIG. 8 is a part side elevation of the arrangement according to the invention of transverse beams of a support structure in a fan cooling tower.

FIG. 4 essentially shows only the air outlet 3, including the fan impeller 4. The fan impeller 4 "centrifuges" water out of the cloud flow against the wall, the cloud flow passing through the air outlet 3 in the direction of the arrows, for instance, at an average velocity of 15 m/sec. At the wall a liquid film 21 is formed which flows down along the wall if sufficiently thick. A film of less thickness may also flow upwardly in the direction of arrow 23 by virtue of the cloud flow in this direction.

A circumferential continuous water catching channel 40 is arranged in the area of the lower edge 24 of the air outlet 3 passage. This water catching channel 40 may be slightly inclined with respect to a horizontal plane towards a vertical fall pipe 41 which extends down along the entire height of the cooling tower and drains into the collecting basin 11. It is also possible to provide several such fall pipes at the periphery of the water catching channel 40.

A second water catching channel 42 is formed sunk in the wall of the air outlet passage 3 above the fan impeller 4 so as to provide an opportunity to catch any upwardly moving water film. This water catching channel 42 also extends around the circumference of the air outlet and communicates with a fall pipe 43 which likewise drains into the collecting basin 11.

Any water separated at the walls of the air outlet 3 can be carried away directly into the collecting basin by the water catching channels 40, 42. Thereby a large part of the separated water no longer remains in continued circulation in the upper zone of the cooling tower, as shown in FIG. 3, where there are favorable conditions for propagation of germs. Therefore, the water is not enriched with germs in undesired manner.

The embodiment according to FIGS. 5 and 6 also contributes to this effect in that the inner wall sections 44 are provided with vertical grooves 45. These grooves 45 enhance the flow-off of water into the water catching channel 40.

FIG. 6a shows grooves 45a which have V-shaped side walls, FIG. 6b shows grooves 45b which have a rectangular cross sectional profile, and FIG. 6c shows grooves 45c which have a semi-circular cross sectional profile.

FIGS. 7a to 7c show different embodiments of the second water catching channel 42.

While the upper edge 46a of the water catching channel 42 according to FIG. 7a lies in the same plane as the sharp lower edge 47a of the channel entrance, the upper edge 46b of the embodiment according to FIG. 7b is offset towards the flow, constituting a damming edge which favors the deflection of the water around the sharp lower edge 47a into the water catching channel.

In the embodiment according to FIG. 7c, the sidewall is formed with a breakthrough to constitute the water catching channel 42, a porous part 48 being inserted in said breakthrough. At the exit side the porous part 48 is covered by a sheet metal ring 49 of rectangular cross sectional profile. At its lower side the ring opens into a fall pipe 41.

Figure 9:
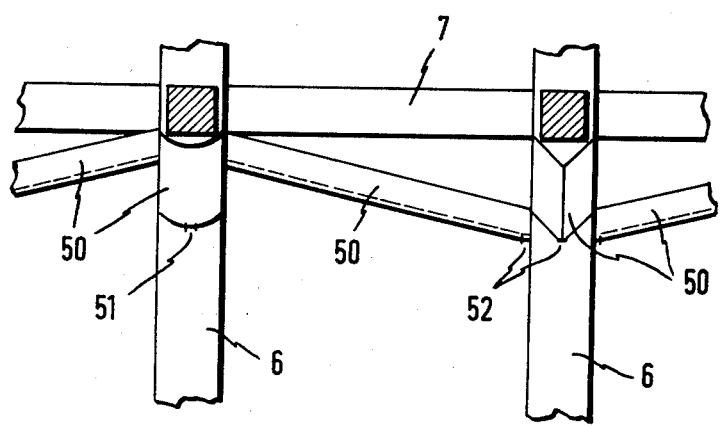
FIG. 9 is a part side elevation similar to FIG. 8 showing the arrangement of water catching channels of horizontal transverse beams in a support structure of the fan cooling tower.

FIGS. 8 and 9 relate to various embodiments of the support structure which includes the vertical supports 6 and the transverse beams 7. In the embodiment shown in FIG. 8 the transverse beams 7 are not arranged horizontally but instead at a water flow-off inclination with respect to the horizontal. The inclination should be no less than about 5°.

These structures prevent water from dropping down from higher beams and being taken back in circulation according to FIG. 3 and upwardly by the cloud flow. Instead the water flows off along the transverse beams 7 and the supports 6 down into the collecting basin 11.

In existing cooling towers in which the transverse beams 7 already are disposed in horizontal planes, water catching channels 50 may be provided below these transverse beams at a water flow-off inclination. These channels are open at the top and either have a V-shaped cross sectional profile, with the tip of the V oriented downwards (shown at the right support 6 in FIG. 9) or a semi-circular cross sectional profile (shown at the left support 6 in FIG. 9). Water dropping down from the transverse beams 7 is guided by these water catching channels 50 to the vertical supports where openings (indicated at 51 and 52) permit the water to flow down along the vertical supports 6.

What is claimed is:

1. A water cooling tower, comprising:
  (a) a hollow housing having a plurality of circumferentially arranged lateral air inlet openings and a central air outlet passage, said outlet passage having successive converging and diverging portions in the discharge direction;
  (b) a suction fan arranged in said air outlet passage adjacent the converging portion thereof;
  (c) trickler means for establishing a downwardly directed curtain of water between said air inlet openings and said air outlet passage;
  (d) cooling means on which the water curtain trickles and along which the air aspired by said fan passes to cool the water;
  (e) collecting basin means for collecting the curtain of water supplied by said trickler means;
  (f) water droplet separator means arranged between said trickler means and said air outlet passage;
  (g) water catching means adjacent said suction fan for catching the water film that is centrifugally deposited by said fan on the inner surface of said air outlet passage, said water catching means comprising at least one annular channel formed in the wall of said outlet passage at a location other than the narrowest portion of said outlet passage; and
  (h) discharge pipe means for draining the water from said catching means directly to said collecting basin means.

2. A water cooling tower as defined in claim 1, wherein a first water catching channel is arranged at a lower elevation than said fan.

3. A water cooling tower, comprising:
  (a) a hollow housing having a plurality of circumferentially arranged lateral air inlet openings and a central air outlet passage, said outlet passage having sucessive converging and diverging portions in the discharge direction;
  (b) a suction fan arranged in said air outlet passage adjacent the converging portion thereof;
  (c) trickler means for establishing a downwardly directed curtain of water between said air inlet openings and said air outlet passage;
  (d) cooling means on which the water curtain trickles and along which the air aspired by said fan passes to cool the water;
  (e) collecting basin means for collecting the curtain of water supplied by said trickler means;
  (f) water droplet separator means arranged between said trickler means and said air outlet passage;
  (g) water catching means adjacent said suction fan for catching the water film that is centrifugally deposited by said fan on the inner surface of said air outlet passage, said water catching means comprising a first annular catching channel arranged below said fan and formed in an enlarged lower edge portion of the wall of said air outlet passage and a second annular catching channel arranged above said fan and formed in an enlarged upper portion of the wall of said air outlet passage; and
  (h) discharge pipe means for draining the water from said catching means directly to said collecting basin means.

4. A water cooling tower as defined by claim 2 or 3, wherein the inner wall of said air outlet passage comprises generally vertical grooves above each catching channel.

5. A water cooling tower as defined by claim 2 or 3, further comprising: a support structure including transverse beams and vertical supports, said transverse beams being arranged between said vertical supports at a water flow-off inclination; and water discharging means connecting said transverse beams with said collecting basin means.

6. A water cooling tower as defined by claim 2 or 3, further comprising: a support structure including transverse beams and vertical supports; third catching channels arranged in said support structure at a water flow-off inclination; and water discharging means connecting said third channels with said collecting basin means.

7. The cooling tower as defined by claim 5 wherein said vertical supports serve as water discharging devices.

8. The cooling tower as defined by claim 6 wherein said vertical supports serve as water discharging devices.

* * * * *